United States Patent
Nishiyama

(10) Patent No.: US 8,831,187 B2
(45) Date of Patent: Sep. 9, 2014

(54) TELEPHONE SYSTEM

(75) Inventor: Satoshi Nishiyama, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1923 days.

(21) Appl. No.: 11/907,185

(22) Filed: Oct. 10, 2007

(65) Prior Publication Data

US 2008/0101560 A1    May 1, 2008

(30) Foreign Application Priority Data

Oct. 26, 2006   (JP) .................................. 2006-291414

(51) Int. Cl.
| | | |
|---|---|---|
| H04M 1/64 | (2006.01) | |
| H04M 3/53 | (2006.01) | |
| H04L 12/58 | (2006.01) | |
| H04M 3/42 | (2006.01) | |
| H04M 7/00 | (2006.01) | |

(52) U.S. Cl.
CPC ......... *H04L 51/043* (2013.01); *H04M 3/42374* (2013.01); *H04M 3/5307* (2013.01); *H04M 7/006* (2013.01)
USPC ..................................... 379/88.25; 379/88.18

(58) Field of Classification Search
CPC ..................... H03M 3/42365; H03M 3/53308
USPC ......... 379/69, 70, 88.12, 88.13, 88.17, 88.22; 455/413, 412.2, 466; 709/206, 207, 709/211, 219
See application file for complete search history.

(56) References Cited

U.S. PATENT DOCUMENTS

| | | | | |
|---|---|---|---|---|
| 5,724,407 A | * | 3/1998 | Bruno et al. ................ | 379/88.13 |
| 6,678,361 B2 | * | 1/2004 | Rooke et al. ................ | 379/93.24 |
| 7,599,473 B2 | * | 10/2009 | Michael et al. ................ | 379/76 |
| 7,813,483 B2 | * | 10/2010 | Gatzke et al. ............... | 379/88.12 |
| 2004/0121761 A1 | * | 6/2004 | Tripathy et al. ............... | 455/413 |
| 2005/0089040 A1 | * | 4/2005 | Kim ........................... | 370/395.2 |
| 2005/0117602 A1 | | 6/2005 | Carrigan et al. | |
| 2006/0031326 A1 | * | 2/2006 | Ovenden ....................... | 709/206 |
| 2006/0099934 A1 | * | 5/2006 | Song et al. ................ | 455/412.2 |
| 2008/0219416 A1 | * | 9/2008 | Roujinsky .................. | 379/88.13 |
| 2008/0298563 A1 | * | 12/2008 | Rondeau et al. .......... | 379/88.22 |
| 2010/0208790 A1 | * | 8/2010 | Kuo et al. ................ | 375/240.01 |

FOREIGN PATENT DOCUMENTS

| | | |
|---|---|---|
| JP | 11-069439 | 3/1999 |
| JP | 2003-134233 | 5/2003 |
| JP | 2004-247904 | 9/2004 |

OTHER PUBLICATIONS

Canadian Office Action dated Sep. 25, 2009.

* cited by examiner

*Primary Examiner* — Fan Tsang
*Assistant Examiner* — Van D Huynh
(74) *Attorney, Agent, or Firm* — Pillsbury Winthrop Shaw Pittman, LLP

(57) ABSTRACT

According to one embodiment, a telephone system includes a plurality of terminal devices which are connected to a packet communication network to realize voice calls with one another via the communication network, an attribute management function which manages attribute information for each user of the terminal devices, a message processing database which associates storage aspects of message information from a calling source user to incoming call destination users to each attribute possible to be owned by the incoming call destination users and stores them in a form of a database, and a message storage control unit which stores the message information to the incoming call destination users in aspects corresponding to the attribute information of the incoming call destination users to be managed by the attribute management function on the basis of content of the message processing database.

15 Claims, 4 Drawing Sheets

| Presence state | Storage location | Storage system |
|---|---|---|
| During on-seat | Terminal A1 | G711 |
| During off-seat | Terminal A1 | G729 |
| During incoming call rejection | Terminal Am | Text (convert voice into text data) |
| Terminal is not connected | Server 20 | MPEG-4 |
| During business trip | Server 30 | MPEG-2 |
| Other state | None | None |

Message processing database 50a

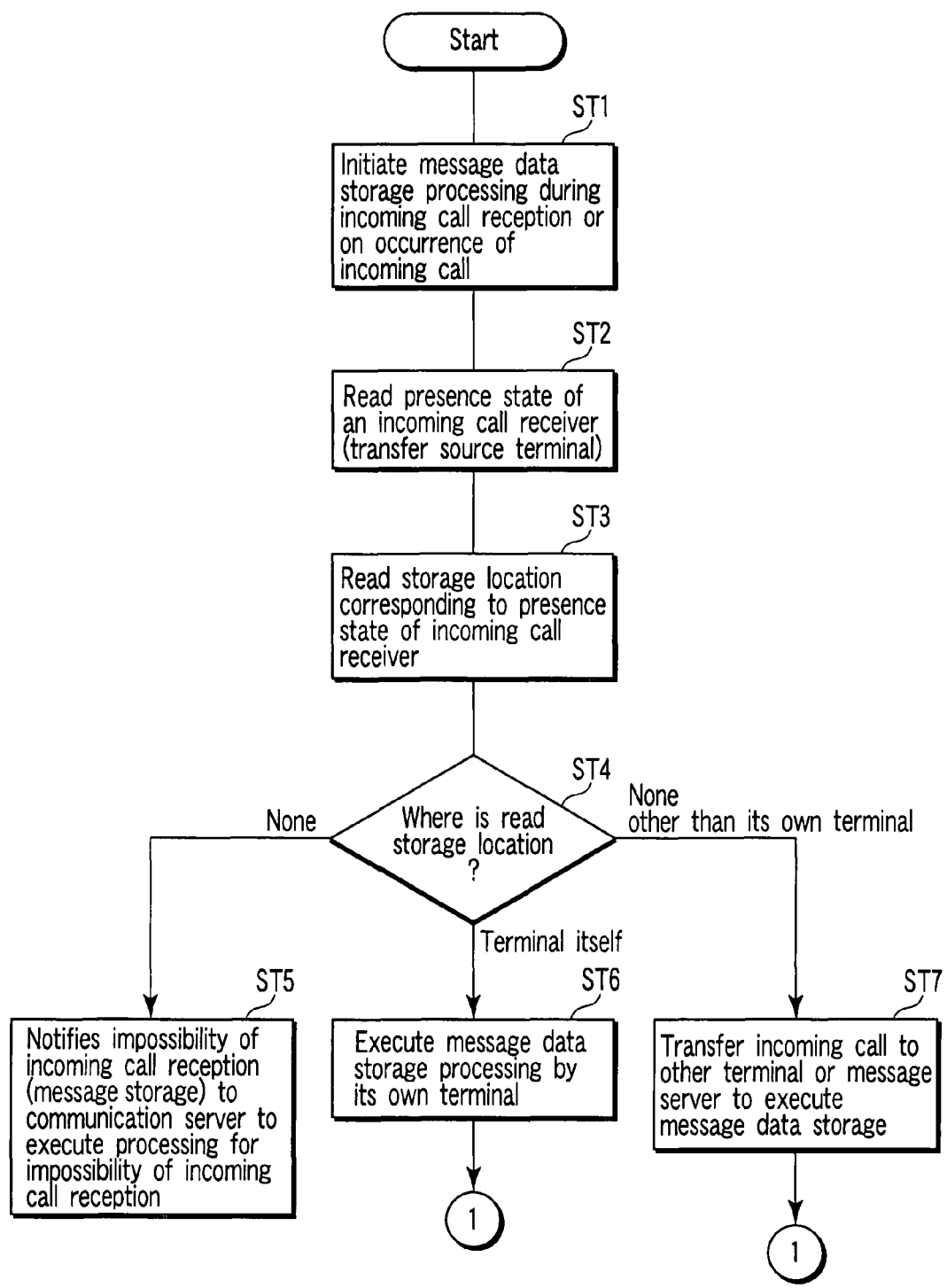
F I G. 3

TELEPHONE SYSTEM

CROSS-REFERENCE TO RELATED APPLICATIONS

This application is based upon and claims the benefit of priority from Japanese Patent Application No. 2006-291414, filed Oct. 26, 2006, the entire contents of which are incorporated herein by reference.

BACKGROUND

1. Field

One embodiment of the invention relates to a telephone system in which telephone terminals and soft phones, etc., achieve voice calls via a network such as an Internet Protocol (IP) network.

2. Description of the Related Art

As described in JP-A 2004-247904 (KOKAI), a telephone system has a message storage function as a basic function of the telephone system. In recent years, telephone systems have become able to store not only voice data but also image data. The aforementioned reference technology sets a compression rate of recording data by paying attention to information on a calling side (calling source).

Many of the IP telephone systems in recent years have presence management functions. Each of these functions manages an attribute at this moment in time of a user every moment for each user. This function may also manage personal information of user's status, such as 'off seat'/'on seat', user's status such as 'in office'/'on business trip', or personal information such as a managerial position and an assigned department. A typical telephone system having the function uses a session initiation protocol (SIP).

As mentioned above, in recent years, the presence management function in the telephone system has attracted attention. Combining the presence management function with a message data storage function presents a possibility to develop a new system application.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary flowchart depicting an example of a processing procedure in an incoming call destination terminal at the time of an occurrence of message data recording in the system of FIG. 1;

DETAILED DESCRIPTION

Various embodiments according to the invention will be described hereinafter with reference to the accompanying drawings. In general, according to one embodiment of the invention, a telephone system includes a plurality of terminal devices which are connected to a packet communication network to realize voice calls with one another via the communication network; an attribute management function which manages attribute information for each user of the terminal devices; a message processing database which associates storage aspects of message information from a calling source user to incoming call destination users to each attribute possible to be owned by the incoming call destination users and stores them in a form of a database; and a message storage control unit which stores the message information to the incoming call destination users in aspects corresponding to the attribute information of the incoming call destination users to be managed by the attribute management function on the basis of content of the message processing database.

Figures 1, 2:
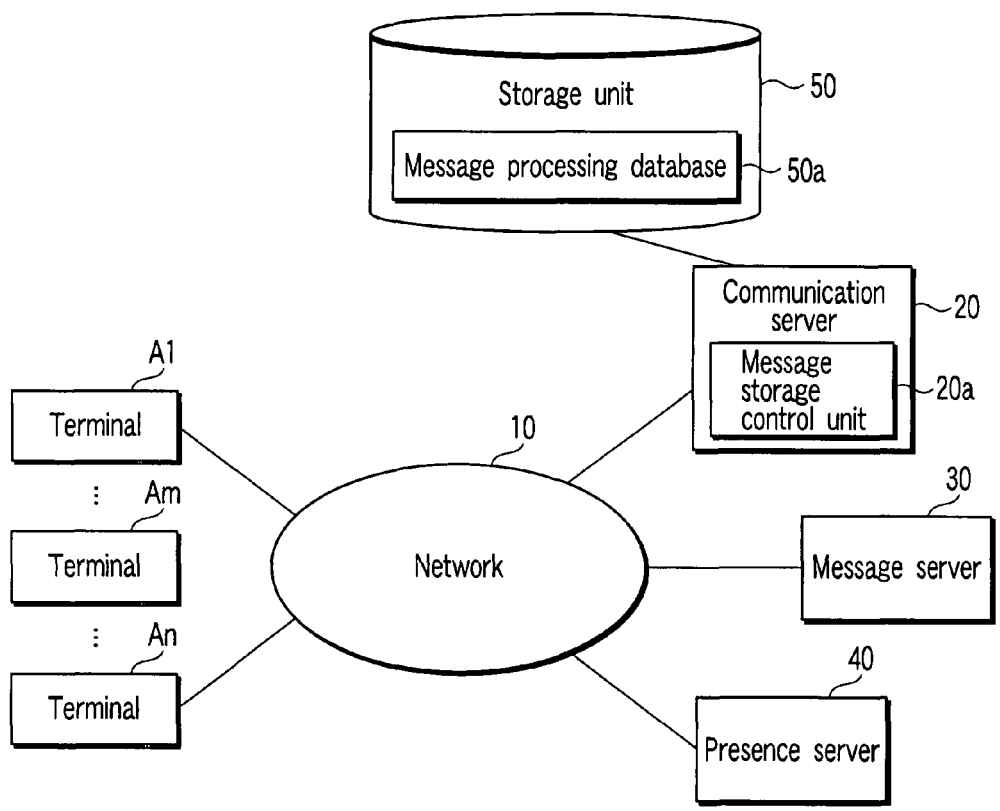
FIG. 1 is an exemplary system view depicting an embodiment of a telephone system regarding the invention.
FIG. 2 is an exemplary view depicting an example of a message processing database 50a stored in a storage unit of FIG. 1.

According to an embodiment, FIG. 1 is a system view illustrating an embodiment of a telephone system regarding the present invention. In the embodiment, the telephone system employs an SIP as a main communication protocol in the system of FIG. 1 then manages the presence for each user in the use of the SIP.

In FIG. 1, each of a plurality of terminals A1-An is connected to a network 10. The network 10 is a communication network, such as a local area network (LAN), wide area network (WAN), and the Internet, using IP. The network 10 connects a communication server 20, a message server 30, and also a presence server 40 to form a voice-over-IP (VOIP) system. If the network 10 is the LAN, the system in FIG. 1 is especially realized as a private extension telephone system.

The terminals A1-An each have functions as IP telephone sets, and achieve voice calls via the network 10. That is, the terminals A1-An may be either hardware-phones (hard-phone) or software-phones (soft-phone). The hard-phone is an exclusive terminal having a function as a telephone set, and the soft-phone is a computer with software for calling installed therein. Each terminal A1-An is, in a word, a device capable of communicating, such as a personal computer, a fixed telephone set, a mobile phone, and a personal digital assistance (PDA).

The communication server 20 performs sequence control concerned to outgoing/incoming call. That is, the communication server 20 has a routing function to connect between terminals, and between terminals and the message server 30, and a proxy function.

The message server 30 has functions to compress, to reproduce, and to store the message data, respectively. The message data includes image data, moving image data, text data, and other multimedia data other than voice data.

The presence server 40 manages presence statuses of users regarding the terminals A1-An. Such a kind of the presence server has been known. According to circumstances, there are a plurality of the presence servers 40 in the system.

By the way, the communication server 20 has a message storage control unit 20a and a storage unit 50 as functional objects regarding the invention. The storage unit 50 stores a message processing database 50a in the storage area of the storage unit 50.

The message processing database 50a is, as shown in FIG. 2, a database indicating a list of storage locations of the message data and storage systems thereof corresponding to the presence statuses for each user. In other words, the message processing database 50a is a database in which the storage states of the message information from a calling source user to an incoming call destination user are associated for each possible presence state of the incoming call destination user to store them in the form of a database.

In FIG. 2, the storage locations and the storage systems of the message addressed to this user are associated for each possible presence state (on seat, off seat, . . . , other states) of the user at a certain one terminal (for example, terminal A1). The corresponding relations are registered for all terminals A1-An, and stored in the form of a database to result in storage in the storage unit 50.

The message storage control unit 20a referees to the message processing database 50a, and stores the message information to the incoming call destination user in an aspect corresponding to the presence status of the incoming call destination user to be managed by the presence server 40 on the basis of the content of the database 50a. Next to this, operations in the foregoing configuration will be described.

FIG. 3 is a flowchart illustrating an example of a processing procedure at an incoming call destination terminal when the message data recording occurs in the system of FIG. 1. The flowchart shows the processing procedure of a terminal in the case of an occurrence of message data storage processing.

In FIG. 3, it is presumed that the message data storage processing starts by the occurrence of automatic transfer processing to the message server 30 at the time of an occurrence of an incoming call to the terminal A1, or by the manual operation during the incoming call (step ST1), The terminal A1 then reads the "presence state" of the terminal's user from the presence server 40 (step ST2). In succession, the terminal A1 reads "message data storage location" corresponding to the read "presence state" from the system setting data storage area of the communication server 20 (step ST3) to determine the "message data storage location" (step ST4).

If the "message data storage location" results in "none", the terminal A1 notifies the fact of the impossibility of the message data storage to the communication server 20, and when receiving this notification, the communication server 20 carries out processing for the impossibility of receiving the incoming call (step ST5). If the "message data storage location" results in "terminal itself", the terminal A1 locally stores the message data in its own built-in memory, etc. (step ST6). If the "message data storage location" results in other than "none" or "terminal itself", the terminal A1 transfers the incoming call to the message data storage location to store the message data (step ST7).

Figure 4:
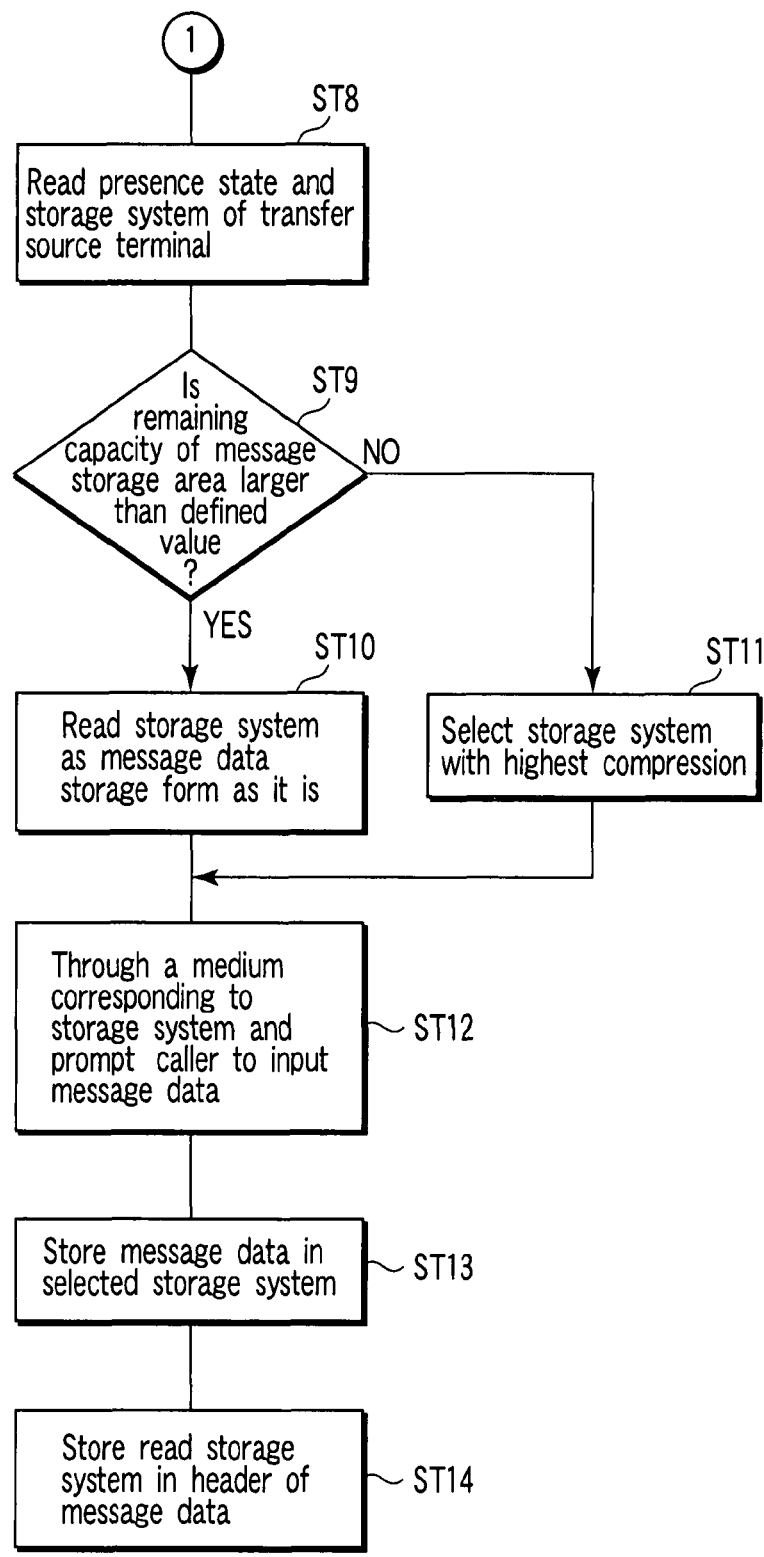
FIG. 4 is an exemplary flowchart depicting an example of a processing procedure of message data storage in the system of FIG. 1.

FIG. 4 is a flowchart illustrating an example of a message data storage processing procedure in the system of FIG. 1. The flowchart shows processing to be performed in the terminal or the message server 30 storing the message data. In FIG. 4, for instance, the message server 30 reads "presence state" of the user of the transfer source terminal to the message data storage terminal, or the message server 30 from the presence server 40. The message server 30 reads "storage system" corresponding to the presence state from the system setting data storage area of the communication server 20 (step ST8).

Next, the message server 30 determines whether or not the remaining capacity of the message storage area is larger than a defined value (step ST9). If it is larger than the defined value, the message server 30 selects the "storage system" read in step ST8 as the message data storage system as it is (step ST10). Otherwise stated, the message server 30 selects the "storage system" with the highest compression rate as the storage system here (step ST11). The message server 30 then establishes a communication with a caller via a medium corresponding to the "storage system" selected in steps ST8 to ST11, and prompts the caller to input the message data (step ST12). After this, the message server 30 stores the message data in the message storage area under the selected "storage system" (step ST13).

For example, even when the caller specifies a video as a medium to try to make a communication, if the "storage system" is G.711, voice communication is established between the caller and the message server 30, and only voice is stored as the message data in the G.711 form in step ST5. At last, the message server 30 stores the selected "storage system" in the header area of the message data (step ST14).

Figure 5:
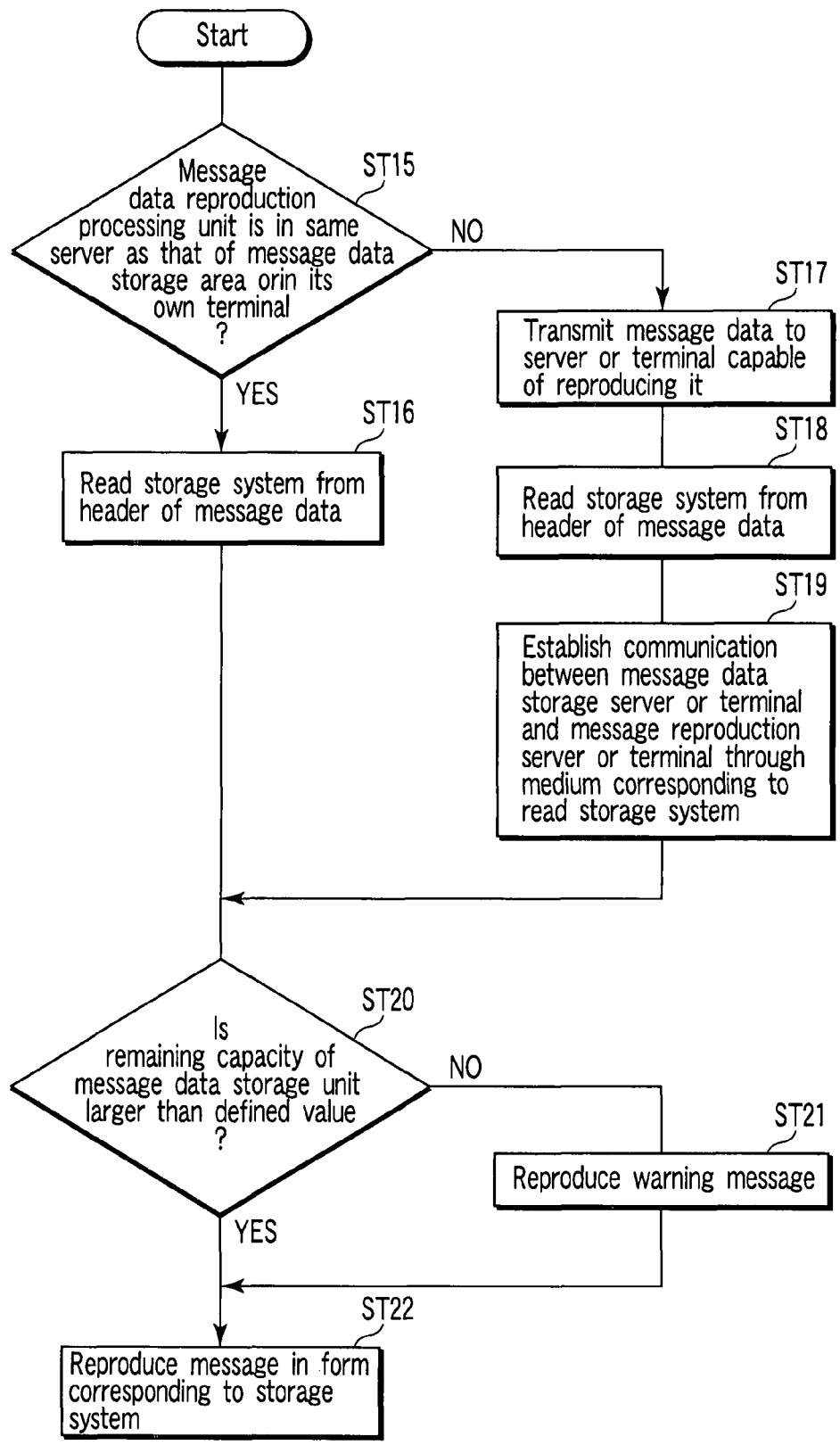
FIG. 5 is an exemplary flowchart depicting an example of a processing procedure of message data reproduction in the system of FIG. 1.

FIG. 5 is a flowchart illustrating an example of a message data reproduction processing procedure in the system of FIG. 1. The flowchart shows the reproduction procedure of the message data conducted by the message data reproduction processing unit provided for this kind of system. In FIG. 5, the terminal A1 requesting for the reproduction of the message data firstly determines whether or not the message data reproduction processing unit is disposed in the same server as that of the message data storage area or disposed in the terminal A1 itself (step ST15).

If the message data reproduction processing unit is disposed in the same server as that of the message data storage area, or disposed in the terminal A1, the terminal A1 reads the "storage system" stored in the header of the message data (step ST16). If the message data reproduction processing unit is not disposed at the aforementioned locations (No, in step ST15), the message data is transmitted to the server or the terminal capable of reproducing it (step ST17), and the "storage system" stored in the header of the message data is read (step ST18). Sequentially, the telephone system of FIG. 1 establishes the communication through the medium corresponding to the read "storage system" between the message data transmission source server or the transmission source terminal and the server or the terminal possible to reproduce the message data (step ST19).

Next to this, the telephone system determines whether the message storage area is larger than the defined value or not (step ST20), if it is larger than the defined value, the telephone system reproduces the message through the form corresponding to the "storage system" (step ST22). Otherwise stated, the processing procedure goes to the reproduction of a warning message (step ST21) then arrives in step ST22. In step ST22, regardless of the presence or absence of the warning message, the message is reproduced in response to the "storage system" stored in the header of the message data.

The existing technique setting the compression rate of the recording data by paying attention only to the information about the calling side (the calling source), it cannot perform the processing corresponding to the information on the incoming call destination, more specifically to the presence state, and it does not take the status of the incoming call destination into account. Furthermore, it also cannot change the data storage location.

In contrast, according to the embodiment, in the case in which an incoming call arrives at the terminal A1 via the network 10, and in which the telephone system leaves a message because of the absence of the user, the telephone system firstly reads the presence state of the user of the terminal A1, The telephone system reads the message data storage aspect (storage location, storage system) based on the presence state from the message processing database 50a to store the message data in accordance with the message data storage aspect.

Configured thus, since the telephone system may decide the compression medium and the compression form for the message data in response to the presence state of the user of the incoming call destination terminal, and so the telephone system becomes able to further flexibly and effectively use the storage area of the message data. The telephone system may specify the data storage location, so that the user is able to store the message data at the location while taking the extraction of the message data. That is the user specifying the location to store the message data, for example, to the local terminal facilitates the access to the message data and further enables giving the order of priority over the message data storage locations.

According to the embodiment, the storage aspect (storage location, storage system, etc.) of the message is variable in response to a presence state of the incoming call destination. In other words, the telephone system becomes able to change the storage status of the message data in response to the status of the incoming call destination, and so it becomes possible to improve the operational convenience.

In short for the description given above, according to the embodiment, changing the storage system of the message data in response to the state (presence state) of the user enables effectively utilizing the message data storage area. For instance, even when the caller specifies the medium through a video call, the telephone system becomes able to store the storage location of the message data by means of the G.711 (voice). Changing the storage location of the message data in accordance with the state of the user allows the user to easily extract the message data and to easily give the order of priority for the storage locations of the message data. Thereby, the storage aspects of the message data become able to be changed in response to the state of the incoming call destination, and so a telephone system to improve the operational convenience may be provided.

The present invention is not limited to the aforementioned embodiment as it is. For example, the communication server 20 and the terminals A1-An may have the function related to the message data of the message server 30 built in. Depending on the request for the system design, the message server 30 does not exist in the telephone system sometimes, and on the contrary, a plurality of the message servers 30 exist therein sometimes. The terminals A1-An may individually store message processing database 50a, and the presence server 40 or the message server 30 stores the information by all terminals A1-An sometimes. Further, a plurality of the communication servers 20 exist in the telephone system sometimes.

In the embodiment, as for the presence state, the presence states of the terminals A1-An being used, the location information of the users of the terminals A1-An, or the managerial position of the user is also usable for the presence state. For instance, preparing a plurality of the message servers and changing the message data storage destination in accordance with the presence state enables setting the message server to store only the message data with a high importance level for the business trip or for the person of the managerial position.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone system comprising:
a plurality of terminal devices which are connected to a packet communication network to realize voice calls with one another via the communication network;
a presence management function which manages each of presence statuses of a plurality of users;
a message processing database which stores a database associating storage location of message information from a calling source user to incoming call destination users of the plurality of users with the presence status of each of the users; and
a message storage control unit which stores the message information to the incoming call destination users to the location corresponding to the presence status of the incoming call destination users to be managed by the presence management function based on content of the message processing database, wherein
the message storage control unit transfers the incoming call to the message data storage location to store the message information to the incoming call destination users.

2. The telephone system according to claim 1, wherein the message processing database is a database which associates storage systems of the message information for said each of the presence statuses.

3. The telephone system according to claim 2, wherein the storage system is a compression system of the message information.

4. The telephone system according to claim 1, further comprising:
a communication server which forms connections via the packet communication network between the terminal device of the calling source user and the terminal devices of the incoming call destination users, wherein
at least either the message processing database or the message storage control unit is provided for the communication server.

5. The telephone system according to claim 1, further comprising:
a presence management server which is provided with the presence management function, wherein
the presence status of said each user is managed by the presence management server.

6. The telephone system according to claim 1, further comprising:
a message server which stores the message information.

7. The telephone system according to claim 1, further comprising:
a communication server which forms connections via the packet communication network between the terminal device of the calling source user and the terminal devices of the incoming call destination users;
a presence management server which is provided with the presence management function; and
a message server which stores the message information therein, wherein
the storage location is any one of the communication server, the presence management server, the message server, and the terminal device of the incoming call destination users.

8. The telephone system according to claim 1, wherein the message storage control unit makes a compression rate of the message information variable in response to the presence statuses of the incoming call destination users.

9. The telephone system according to claim 8, wherein the presence statuses of the incoming call destination users are the managerial positions of the users.

10. A server unit applied to a telephone system comprising a plurality of terminal devices which are connected to a packet communication network to realize voice calls with one another via the communication network and a presence management function which manages each of presence statuses of a plurality of users, the server unit comprising:

a function to form connections via the packet communication network between the terminal device of the calling source user and the terminal devices of the incoming call destination users;

a message processing database which stores a database associating storage location of message information from a calling source user to incoming call destination users of the plurality of users with the presence status of each of the users; and a message storage control unit which stores the message information to the incoming call destination users to the location corresponding to the presence status of the incoming call destination users to be managed by the presence management function based on content of the message processing database; wherein the message storage control unit transfers the incoming call to the message data storage location to store the message information to the incoming call destination users.

11. The server unit of claim 10, wherein
the message processing database is a database which associates storage systems of the message information for said each of the presence statuses.

12. The server unit of claim 11, wherein
the storage system is a compression system of the message information.

13. The server unit of claim 10, further comprising:
a message server which stores the message information.

14. The server unit of claim 11, wherein
the message storage control unit makes a compression rate of the message information variable in response to the presence statuses of the incoming call destination users.

15. The server unit of claim 14, wherein
the presence statuses of the incoming call destination users are the managerial positions of the users.

* * * * *